United States Patent
Kobayashi et al.

(10) Patent No.: US 10,681,250 B2
(45) Date of Patent: Jun. 9, 2020

(54) IN-VEHICLE CAMERA APPARATUS

(71) Applicant: DENSO CORPORATION, Kariya, Aichi-pref. (JP)

(72) Inventors: Shunya Kobayashi, Kariya (JP); Koji Wato, Kariya (JP)

(73) Assignee: DENSO CORPORATION, Kariya, Aichi-pref (JP)

(*) Notice: Subject to any disclaimer, the term of this patent is extended or adjusted under 35 U.S.C. 154(b) by 73 days.

(21) Appl. No.: 16/140,854

(22) Filed: Sep. 25, 2018

(65) Prior Publication Data
US 2019/0104244 A1  Apr. 4, 2019

(30) Foreign Application Priority Data

Sep. 29, 2017  (JP) .................... 2017-191112

(51) Int. Cl.
| | | |
|---|---|---|
| *H04N 5/225* | (2006.01) | |
| *H04N 5/247* | (2006.01) | |
| *B60R 11/04* | (2006.01) | |
| *B60R 11/00* | (2006.01) | |

(52) U.S. Cl.
CPC ......... *H04N 5/22521* (2018.08); *B60R 11/04* (2013.01); *H04N 5/2253* (2013.01); *H04N 5/247* (2013.01); *B60R 2011/0003* (2013.01); *B60R 2011/0026* (2013.01); *H04N 5/2252* (2013.01)

(58) Field of Classification Search
None
See application file for complete search history.

(56) References Cited

U.S. PATENT DOCUMENTS

| | | |
|---|---|---|
| 6,811,330 B1 | 11/2004 | Tozawa |
| 2008/0001727 A1 | 1/2008 | Ohsumi et al. |
| 2009/0135246 A1 | 5/2009 | Uchiyama et al. |
| 2010/0128245 A1 | 5/2010 | Inagaki et al. |
| 2014/0132739 A1 | 5/2014 | Ohsumi et al. |
| 2016/0006911 A1* | 1/2016 | Kimura ................ H04N 5/2252 348/47 |
| 2017/0217382 A1* | 8/2017 | Gunes ....................... B60R 1/00 |
| 2018/0312116 A1* | 11/2018 | Brok ........................ B60S 1/023 |
| 2018/0343439 A1* | 11/2018 | Furutake ............. H04N 5/2258 |

(Continued)

FOREIGN PATENT DOCUMENTS

| | | |
|---|---|---|
| DE | 29807969 U1 | 8/1998 |
| DE | 202005017430 U1 | 9/2006 |
| JP | H11-301365 A | 11/1999 |

(Continued)

*Primary Examiner* — William B Perkey
(74) *Attorney, Agent, or Firm* — Maschoff Brennan

(57) ABSTRACT

An in-vehicle camera apparatus is provided for use in a vehicle. The in-vehicle camera apparatus includes at least one image capturing unit configured to capture an image of an external environment of the vehicle, at least one housing configured to have the at least one image capturing unit mounted thereto, and a mounting part via which the at least one housing is to be mounted to the vehicle. The mounting part is made of a material having a lower coefficient of linear expansion than the at least one housing. The mounting part has at least one first portion configured to be fixed to the vehicle and a plurality of second portions configured to be fixed to the at least one housing.

9 Claims, 2 Drawing Sheets

(56) References Cited

U.S. PATENT DOCUMENTS

2019/0100158 A1    4/2019  Wato et al.
2019/0104244 A1*   4/2019  Kobayashi ............. H04N 5/247

FOREIGN PATENT DOCUMENTS

| | | |
|---|---|---|
| JP | 2001-088623 A | 4/2001 |
| JP | 2003-335180 A | 11/2003 |
| JP | 2007-225543 A | 9/2007 |
| JP | 2009-068906 A | 4/2009 |
| JP | 2011-123078 A | 6/2011 |
| JP | 2014-065393 A | 4/2014 |
| WO | WO 2015/032512 A1 | 3/2015 |

* cited by examiner

IN-VEHICLE CAMERA APPARATUS

CROSS-REFERENCE TO RELATED APPLICATION

This application is based on and claims priority from Japanese Patent Application No. 2017-191112 filed on Sep. 29, 2017, the contents of which are hereby incorporated by reference in its entirety into this application.

BACKGROUND

1 Technical Field

The present invention relates to in-vehicle (or onboard) camera apparatuses for use in vehicles.

2 Description of Related Art

Conventionally, in vehicles, there are installed in-vehicle camera apparatuses that include image capturing units for capturing images of the surroundings of the vehicles. Moreover, there are cases where these in-vehicle camera apparatuses are installed at locations (e.g., under the vehicle roof) where it is easy for them to be subjected to high temperatures. In these cases, when housings of the in-vehicle camera apparatuses, to which the image capturing units are mounted, are deformed by thermal expansion due to the high temperatures, the positions or orientations (i.e., image capturing directions) of the image capturing units may become different from the original positions or orientations as designed, making it impossible to capture desired images through the image capturing units.

To solve the above problem, Japanese Patent Application Publication No. JPH11301365A discloses an in-vehicle camera apparatus in which: a fixing part is provided at a rear end of a camera stay (corresponding to a housing); and the fixing part is mounted to a vehicle-side mounting part via a spacer having low thermal conductivity. In addition, in the in-vehicle camera apparatus, the positions of a pair of image capturing units are defined by a rib provided at a front end of the camera stay.

However, with the configuration of the in-vehicle camera apparatus disclosed in the above patent document, when the camera stay is heated by heat transmitted thereto from the image capturing units and/or any other components, the spacer may become a barrier impeding dissipation of the heat of the camera stay to the vehicle body. Consequently, it may become impossible to sufficiently suppress the camera stay from being deformed by thermal expansion.

The inventors of the present application have found, through detailed investigation, that with the configuration of the in-vehicle camera apparatus disclosed in the above patent document, the positions of the image capturing units may deviate from desired positions due to the deformation of the camera stay by thermal expansion. In addition, it should be noted that the term deformation used hereinafter encompasses homothetic enlargement or reduction in size.

SUMMARY

According to exemplary embodiments, there is provided an in-vehicle camera apparatus for use in a vehicle. The in-vehicle camera apparatus includes at least one image capturing unit configured to capture an image of an external environment of the vehicle, at least one housing configured to have the at least one image capturing unit mounted thereto, and a mounting part via which the at least one housing is to be mounted to the vehicle. The mounting part is made of a material having a lower coefficient of linear expansion than the at least one housing. The mounting part has at least one first portion configured to be fixed to the vehicle and a plurality of second portions configured to be fixed to the at least one housing.

With the above configuration, when the at least one housing is subjected to a high temperature to be thermally deformed, change in the positional relationship between those parts of the at least one housing which are respectively fixed to the second portions of the mounting part is suppressed. Consequently, deviation of the position of the at least one image capturing unit from a desired position due to the thermal deformation of the at least one housing is suppressed.

BRIEF DESCRIPTION OF THE DRAWINGS

The present invention will be understood more fully from the detailed description given hereinafter and from the accompanying drawings of exemplary embodiments, which, however, should not be taken to limit the present invention to the specific embodiments but are for the purpose of explanation and understanding only.

In the accompanying drawings.

DESCRIPTION OF EMBODIMENTS

Exemplary embodiments will be described hereinafter with reference to FIGS. 1 and 2.

First Embodiment

Figure 1:
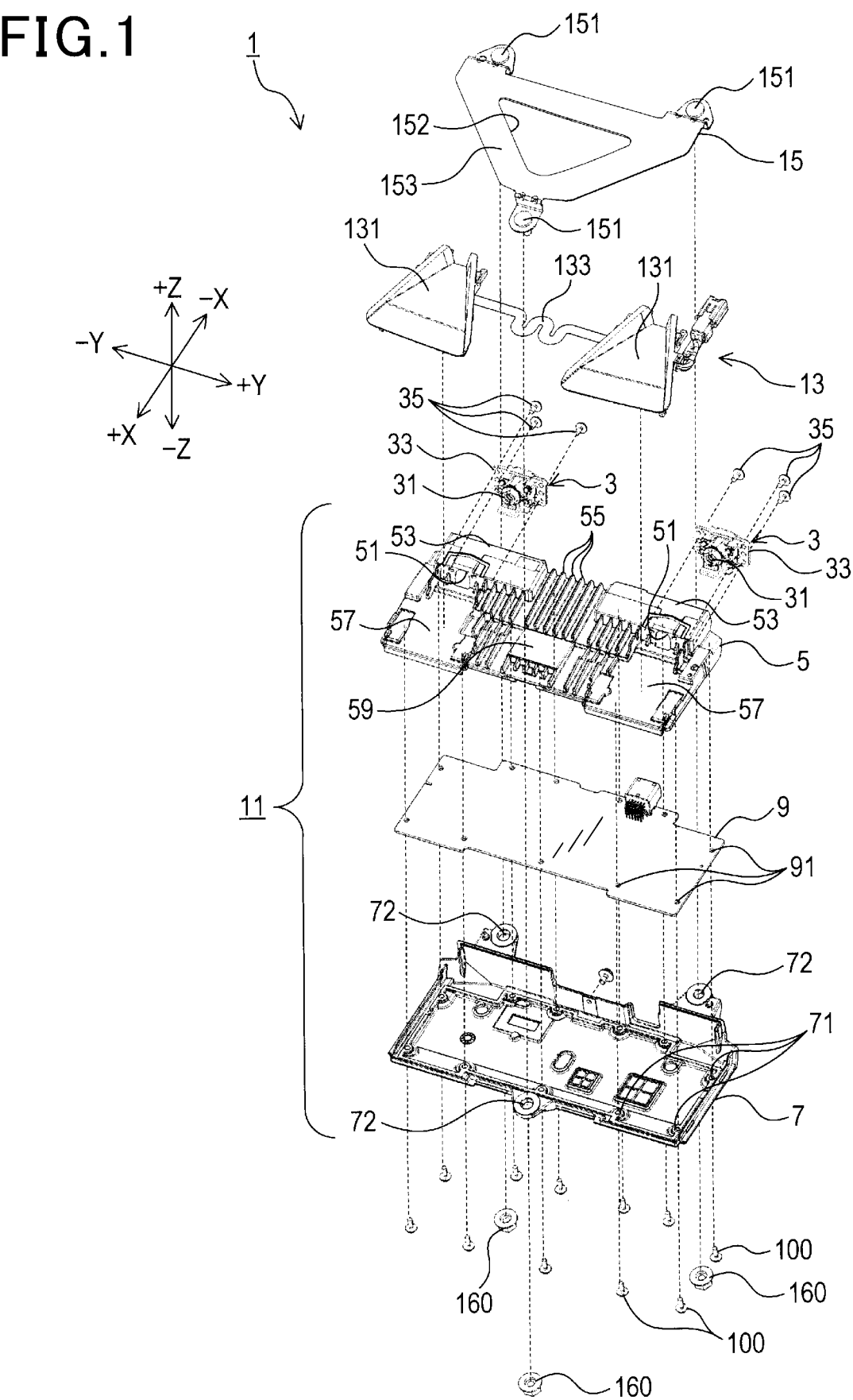
FIG. 1 is an exploded perspective view of an in-vehicle camera apparatus according to a first embodiment.

FIG. 1 shows the overall configuration of an in-vehicle camera apparatus 1 according to the first embodiment.

As shown in FIG. 1, the in-vehicle camera apparatus 1 includes a camera main body 11, a heater 13 and a metal bracket 15. The camera main body 11 includes a pair of image capturing units 3, a first housing 5, a second housing 7 and a circuit board 9. The circuit board 9 is configured to perform control relating to the image capturing units 3.

Each of the image capturing units 3 has a lens 31 exposed on a first surface thereof. Moreover, each of the image capturing units 3 includes an image capturing element (e.g., a CCD) that converts images formed by the lens 31 into electrical signals. In addition, for the sake of simplicity, the image capturing element is not shown in FIG. 1.

The image capturing units 3 are mounted to the first housing 5 so that: the image capturing units 3 are aligned with each other in a longitudinal direction of the first housing 5; both the first surfaces of the image capturing units 3 face the same direction; and the lenses 31 of the image capturing units 3 are respectively exposed from a pair of holes 51 that are formed in the first housing 5 in alignment with each other in the longitudinal direction of the first housing 5.

More specifically, the first housing 5 has a pair of receiving portions 53 that are formed to partially bulge in the same direction. The holes 51 are respectively formed in the receiving portions 53 so as to open on the same side of the receiving portions 53. The image capturing units 3 are respectively received in the receiving portions 53 with the lenses 31 of the image capturing units 3 respectively exposed from the holes 51.

Hereinafter, for the sake of convenience, the positional relationship between the components of the in-vehicle camera apparatus 1 will be described using a right-handed coordinate system whose +X direction represents the direction which both the first surfaces of the image capturing units 3 face and +Z direction represents the direction in which both the receiving portions 53 of the first housing 5 partially bulge. In addition, it should be noted that the right-handed coordinate system is independent of the forward, backward, left, right, upward and downward directions of a vehicle in which the in-vehicle camera apparatus 1 is used.

Each of the image capturing units 3 has two flanges 33 protruding respectively in the +Y and −Y directions. The flanges 33 are fixed via screws 35 to an interior wall surface of a corresponding one of the receiving portions 53 of the first housing 5 around a corresponding one of the holes 51 of the first housing 5. Consequently, both the image capturing units 3 are fixed to and supported by the first housing 5.

When viewed in the ±Z direction, each of the first housing 5, the circuit board 9 and the second housing 7 has a substantially rectangular shape whose longer sides extend in the ±Y direction. Moreover, the circuit board 9 has a plurality of through-holes 91 that are formed along an outer periphery of the longitudinal shape of the circuit board 9 to penetrate the circuit board 9 in the ±Z direction. Similarly, the second housing 7 has a plurality of through-holes 71 that are formed along an outer periphery of the longitudinal shape of the second housing 7 to penetrate the second housing 7 in the ±Z direction.

In assembling the camera main body 11, the first housing 5, the circuit board 9 and the second housing 7 are arranged in this order from the +Z side to the −Z side to overlap each other in the ±Z direction. Then, from the −Z side of the second housing 7, a plurality of screws 100 are fastened, respectively through the through-holes 71 of the second housing 7 and the through-holes 91 of the circuit board 9, into the first housing 5. Consequently, the first housing 5, the circuit board 9 and the second housing 7 are sequentially mechanically connected, forming the camera main body 11 as shown in FIG. 2.

Figure 2:
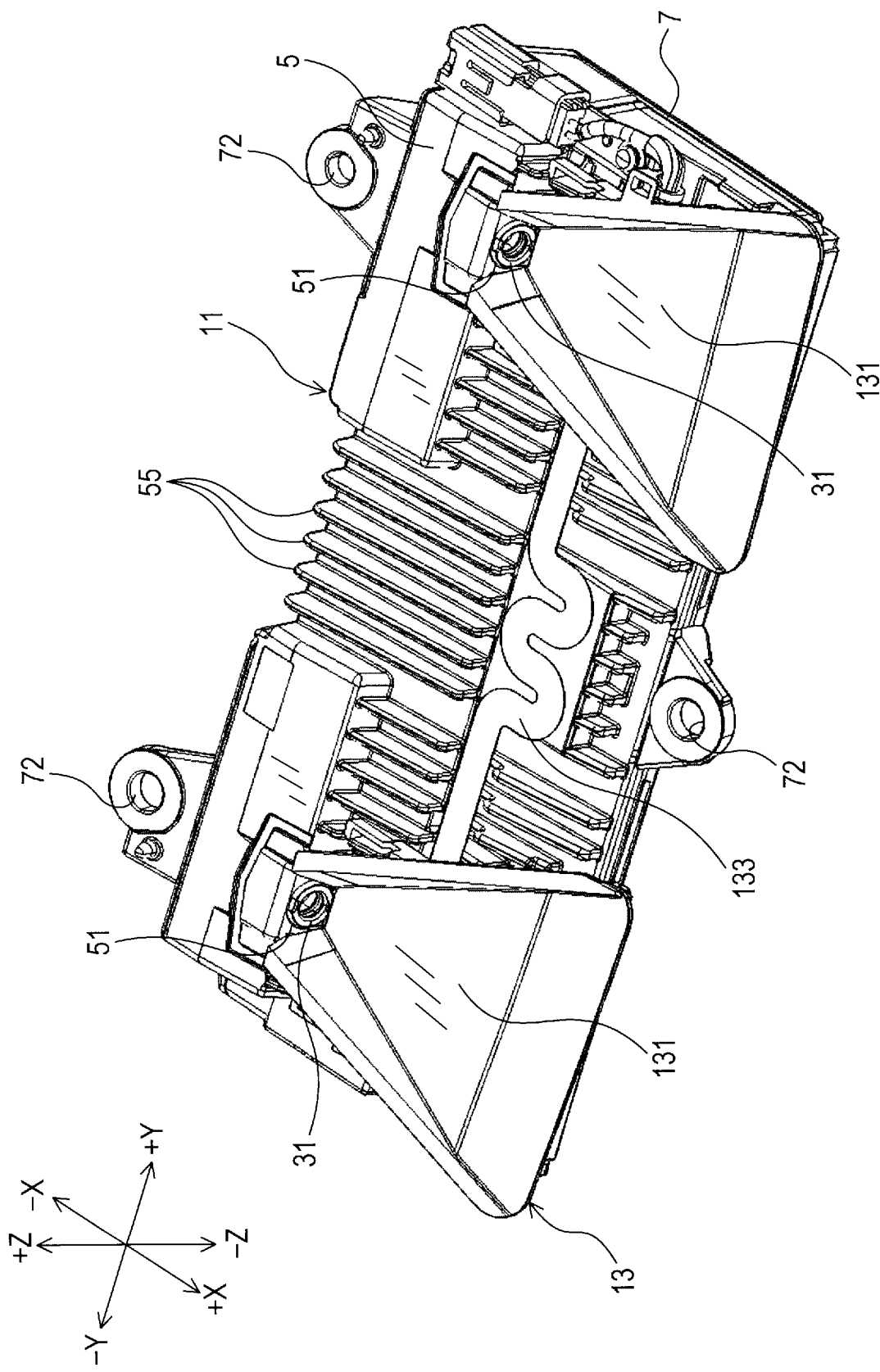
FIG. 2 is a perspective view of both a camera main body and a heater of the in-vehicle camera apparatus which are assembled to each other.

As shown in FIGS. 1 and 2, the heater 13 is arranged on the +Z side of the first housing 5 to overlap the first housing 5 in the ±Z direction. On a surface of the first housing 5 on the +Z side, there are formed heat-dissipating fins 55 except for those areas of the surface where the receiving portions 53 are formed and that area of the surface which overlaps the heater 13.

The heater 13 is configured to have a pair of hood portions 131 and a heat-generating portion 133. The hood portions 131 function as camera hoods respectively for the pair of image capturing units 3. The heat-generating portion 133 generates heat upon being energized. The hood portions 131 and the heat-generating portion 133 are connected to one another in the ±Y direction with the heat-generating portion 133 interposed between the hood portions 131.

As shown in FIG. 1, the first housing 5 has a pair of flat portions 57 each of which is formed on the +X side of one of the holes 51 of the first housing 5 so as to be recessed in the −Z direction. Moreover, as shown in FIG. 2, on the flat portions 57 of the first housing 5, there are respectively arranged the hood portions 131 of the heater 13. On the other hand, the heat-generating portion 133 of the heater 13 is arranged on a flat portion 59 of the first housing 5 which is not recessed in the −Z direction and on which no heat-dissipating pins 55 are formed (see FIG. 1).

The second housing 7 has a protruding portion that is formed, at the center of that longer side of the longitudinal shape of the second housing 7 which is on the +X side, to protrude from both the first housing 5 and the circuit board 9 in the +X direction. The second housing 7 also has a pair of protruding portions that are formed, respectively close to the ends of that longer side of the longitudinal shape of the second housing 7 which is on the −X side, to protrude from both the first housing 5 and the circuit board 9 in the −X direction. That is, the second housing 7 has a total of three protruding portions. Moreover, in each of the three protruding portions, there is formed a through-hole 72 that penetrates the protruding portion in the ±Z direction and has a larger diameter than both the through-holes 71 of the second housing 7 and the through-holes 91 of the circuit board 9. In addition, when viewed in the ±Z direction, each of the through-holes 72 of the second housing 7 on the −X side is located in close vicinity to an imaginary line that extends from a corresponding one of the lenses 31 of the image capturing units 3 in the −X direction (see FIG. 2).

In the present embodiment, both the first and second housings 5 and 7 are made by aluminum die casting. On the other hand, the metal bracket 15, which will be described in detail below, is made by press working on an iron (or steel) plate.

As shown in FIG. 1, the metal bracket 15 is triangular plate-shaped to have three vertex portions. In each of the three vertex portions, there is supported a bolt 151 so as to protrude from the vertex portion in the −Z direction. That is, the metal bracket 15 has a total of three bolts 151 provided therein.

In assembling the in-vehicle camera apparatus 1, the camera main body 11 is attached, along with the heater 13, to the metal bracket 15 to have the three bolts 151 extend respectively through the three through-holes 72 of the second housing 7. Then, three nuts 160 are respectively fastened onto the three bolts 151. Consequently, the second housing 7 is fixed to the metal bracket 15. In addition, before the fixing of the second housing 7 to the metal bracket 15, the camera main body 11 has been assembled as described above and the heater 13 has been arranged on the +Z side of the first housing 5 as described above.

The metal bracket 15 has a center hole 152 formed in a central part thereof. The center hole 152 has a triangular shape substantially homothetic to the external shape (or contour) of the metal bracket 15.

In mounting the in-vehicle camera apparatus 1 to a vehicle, the metal bracket 15 is bonded and thus fixed to an upper part of a front windshield of the vehicle by an adhesive that is applied on a major surface 153 of the metal bracket 15 on the +Z side. More specifically, the metal bracket 15 is fixed to the upper part of the front windshield of the vehicle so that: the ±Y direction of the above right-handed coordinate system coincides with the lateral (or left-right) direction of the vehicle; and both the +X and +Z directions of the above right-handed coordinate system are oriented forward of the vehicle. After the fixing of the metal bracket 15 to the upper part of the front windshield of the vehicle, the camera main body 11 and the heater 13 are fixed to the metal bracket 15 by attaching them to the metal bracket 15 to have the bolts 151 extend respectively through the through-holes 72 of the second housing 7 and fastening the nuts 160 respectively onto the bolts 151 as described above.

It should be noted that the metal bracket 15 may alternatively be fixed to the upper part of the front windshield of the vehicle in a different posture from the above as needed. Moreover, it also should be noted that the metal bracket 15 may alternatively be fixed to other parts of the front windshield of the vehicle than the upper part or other components of the vehicle than the front windshield as needed.

In addition, it also should be noted that a drawing process may be performed on the +Z-side major surface 153 of the metal bracket 15 to improve the strength of the metal bracket 15.

According to the present embodiment, it is possible to achieve the following advantageous effects.

(1) In the present embodiment, the in-vehicle camera apparatus 1 includes the pair of image capturing units 3, the first and second housings 5 and 7 and the metal bracket 15. The image capturing units 3 are configured to capture images of the external environment (or the surroundings) of the vehicle. The first and second housings 5 and 7 are fixed to each other via the screws 100. The first housing 5 has the image capturing units 3 mounted thereto. The metal bracket 15 constitutes a mounting part of the in-vehicle camera apparatus 1; via the mounting part, the first and second housings 5 and 7 are mounted to the vehicle. The metal bracket 15 is made of iron while the first and second housings 5 and 7 are made of aluminum. That is to say, the metal bracket 15 is made of a material having a lower coefficient of linear expansion than the first and second housings 5 and 7. The metal bracket 15 has the +Z-side major surface 153 fixed to the upper part of the front windshield of the vehicle and the three bolts 151 fixed to the second housing 7 by the nuts 160.

With the above configuration, when the first and second housings 5 and 7 are subjected to a high temperature and thus going to be thermally deformed, change in the positional relationship between the through-holes 72 of the second housing 7, through which the bolts 151 respectively extend, is suppressed. Consequently, deviation of the positions of the image capturing units 3 from desired positions due to the thermal deformation of the first and second housings 5 and 7 is suppressed.

(2) In the present embodiment, the first housing 5 has the heat-dissipating fins 55 formed on the +Z-side surface thereof.

With the heat-dissipating fins 55, it is possible to dissipate the heat of the first housing 5. Consequently, it is possible to more effectively suppress deviation of the positions of the image capturing units 3 from the desired positions.

(3) In the present embodiment, the in-vehicle camera apparatus 1 includes the pair of image capturing units 3. That is to say, the in-vehicle camera apparatus 1 is configured as a stereo camera apparatus. Moreover, the image capturing units 3 are respectively received in the receiving portions 53 formed in the first housing 5. That is to say, the first housing 5 is configured to define the positional relationship between the image capturing units 3.

With the above configuration, it may be easy for the positional relationship between the image capturing units 3 to be changed due to the thermal deformation of the first housing 5. However, as described above, according to the present embodiment, it is possible to suppress deviation of the positions of the image capturing units 3 from the respective desired positions; consequently, it is also possible to suppress change in the positional relationship between the image capturing units 3.

(4) In the present embodiment, the pair of image capturing units 3 are aligned with each other in the ±Y direction with a clearance provided therebetween. Moreover, of the three bolts 151 provided in the metal bracket 15, the two bolts 151 on the −X side are spaced from each other in the ±Y direction at an interval that includes the clearance between the pair of image capturing units 3.

More specifically, in the present embodiment, of the three through-holes 72 of the second housing 7 through of which the three bolts 151 respectively extend, the two through-holes 72 on the −X side are located respectively close to the imaginary lines that extend respectively from the lenses 31 of the image capturing units 3 in the −X direction (see FIG. 2). Hence, those two of the three bolts 151 which are on the −X side are spaced from each other in the ±Y direction at an interval that includes at least the clearance between the pair of image capturing units 3. More particularly, in the present embodiment, the clearance between the pair of image capturing units 3 is represented by the distance between an edge of the +Y-side flange 33 of the −Y-side image capturing unit 3 and an edge of the −Y-side flange 33 of the +Y-side image capturing unit 3.

With the above configuration, it is possible to more effectively suppress change in the clearance between the pair of image capturing units 3 due to the thermal deformation of the first housing 5.

(5) In the present embodiment, the in-vehicle camera apparatus 1 includes the heater 13 that has the pair of hood portions 131 integrally formed therein. The hood portions 131 respectively function as the camera hoods for the pair of image capturing units 3.

With the above configuration, it is possible to heat the hood portions 131 provided respectively for the image capturing units 3. Consequently, with the heat of the hood portions 131, it is possible to suppress the lenses 31 of the image capturing units 3 and the front windshield of the vehicle from being fogged.

(6) In the present embodiment, the metal bracket 15, which constitutes the mounting part of the in-vehicle camera apparatus 1, is formed separately from the first and second housings 5 and 7 and to be fixed between the first housing 5 and the front windshield of the vehicle.

With the above configuration, it is possible to easily form the mounting part of the in-vehicle camera apparatus 1 (i.e., the metal bracket 15). Moreover, it is also possible to easily mount the first and second housings 5 and 7 to the vehicle via the mounting part.

(7) In the present embodiment, the metal bracket 15, which constitutes the mounting part of the in-vehicle camera apparatus 1, is plate-shaped. Moreover, the major surface 153 of the petal bracket 15 which is on the opposite side to the first and second housings 5 and 7 (i.e., on the +Z side) constitutes a first portion of the mounting part; the first portion is fixed to the upper part of the front windshield of the vehicle. On the other hand, the three bolts 151, which are provided in the metal bracket 15 to protrude toward the first and second housings 5 and 7 (i.e., in the −Z direction), respectively constitute three second portions of the mounting part; the three second portions are fixed to the second housing 7.

With the above configuration, it is possible to easily form the metal bracket 15 by, for example, press working on an iron plate. Moreover, it is also possible to easily fix the metal bracket 15 between the windshield of the vehicle and the second housing 7.

(8) In the present embodiment, the metal bracket 15, which constitutes the mounting part of the in-vehicle camera apparatus 1, is made of iron while the first and second housings 5 and 7 are made of aluminum.

With the above configuration, it is possible to reduce the manufacturing cost of the metal bracket 15. Moreover, it is possible to form the first and second housings 5 and 7 by aluminum die casting, thereby realizing the complicated shapes of the first and second housings 5 and 7 at high accuracy and low cost.

Second Embodiment

An in-vehicle camera apparatus 1 according to a second embodiment has almost the same configuration as the in-vehicle camera apparatus 1 according to the first embodiment. Therefore, only the differences therebetween will be described hereinafter.

In the first embodiment, both the first and second housings 5 and 7 are made of aluminum. The metal bracket 15, which is made of iron, constitutes the mounting part of the in-vehicle camera apparatus 1 via which the first and second housings 5 and 7 are mounted to the vehicle.

In comparison, in the present embodiment, the second housing 7 is made of iron while the first housing 5 is made of aluminum. The second housing 7 constitutes a mounting part of the in-vehicle camera apparatus 1; via the mounting part, the first housing 5 is mounted to the vehicle. Moreover, the through-holes 72 of the second housing 7 respectively constitute a plurality of first portions of the mounting part; the first portions are fixed to the vehicle. On the other hand, the through-holes 71 of the second housing 7 respectively constitute a plurality of second portions of the mounting part; the second portions are fixed to the first housing 5.

As above, in the present embodiment, the second housing 7, which constitutes the mounting part of the in-vehicle camera apparatus 1, is made of a material (i.e., iron) having a lower coefficient of linear expansion than the aluminum-made first housing 5. Consequently, it is possible to achieve the advantageous effects (1)-(5) described in the first embodiment.

In addition, in the present embodiment, the metal bracket 15 may be omitted from the in-vehicle camera apparatus 1, thereby reducing the manufacturing cost of the in-vehicle camera apparatus 1. In this case, three bolts 151 may be provided in the vehicle to protrude, for example, from the roof of the vehicle. The in-vehicle camera apparatus 1 may be mounted to the vehicle by placing it to have the three bolts 151 extend respectively through the three through-holes 72 of the second housing 7 and fastening the nuts 160 respectively onto the bolts 151.

While the above particular embodiments have been shown and described, it will be understood by those skilled in the art that various modifications, changes, and improvements may be made without departing from the spirit of the present invention.

For example, in the above-described embodiments, the second housing 7 has the through-holes 71 formed therein. The first and second housings 5 and 7 are fixed to each other by fastening the screws 100, respectively through the through-holes 71 of the second housing 7, into the first housing 5. Alternatively, the first housing may have a plurality of through-holes formed therein; the first and second housings 5 and 7 may be fixed to each other by fastening the screws 100, respectively through the through-holes of the first housing 5, into the second housing 7. Moreover, the first and second housings 5 and 7 may alternatively be fixed to each other by welding or bonding.

In the above-described embodiments, the first and second housings 5 and 7 are fixed to each other with the circuit board 9 interposed therebetween. Alternatively, the circuit board 9 may be embedded between the first and second housings 5 and 7; and the first and second housings 5 and 7 may be directly fixed to each other on the periphery of the circuit board 9.

In the above-described embodiments, in the mounting part (i.e., the metal bracket 15 or the second housing 7) of the in-vehicle camera apparatus 1, the at least one first portion (i.e., the major surface 153 of the metal bracket 15 or the through-holes 72 of the second housing 7) is formed to be different from any of the plurality of second portions (i.e., the bolts 151 provided in the metal bracket 15 or the through-holes 71 of the second housing 7). Alternatively, the at least one first portion may be formed to be the same as any of the plurality of second portions.

In the above-described embodiments, the in-vehicle camera apparatus 1 is configured as a stereo camera apparatus with the pair of image capturing units 3. Alternatively, the in-vehicle camera apparatus 1 may be configured as a monocular camera apparatus with a single image capturing unit.

In the above-described first embodiment, the heater 13 is provided between the first housing 5 and the metal bracket 15 in the in-vehicle camera apparatus 1. However, the heater 13 may be omitted from the in-vehicle camera apparatus 1. Moreover, the components of the in-vehicle camera apparatus 1 may alternatively have shapes different from those shown in FIGS. 1 and 2. For example, the second portions of the mounting part (i.e., the bolts 151 of the metal bracket 15) may alternatively be provided so that all of the second portions are located within the clearance between the pair of image capturing units 3 in the ±Y direction.

In the above-described embodiments, the mounting part (i.e., the metal bracket 15 or the second housing 7) of the in-vehicle camera apparatus 1 is made of iron while the first housing 5 is made of aluminum. Alternatively, the mounting part and the first housing 5 may be made of other materials than iron and aluminum such that the material of the mounting part has a lower coefficient of linear expansion than the material of the first housing 5.

In the above-described embodiments, a single or a plurality of functions performed by a single element may alternatively be performed by a plurality of elements. In contrast, a single or a plurality of functions performed by a plurality of elements may alternatively be performed by a single element. Moreover, one or more elements may be omitted from or added to the configuration of the in-vehicle camera apparatus 1 as needed.

What is claimed is:

1. An in-vehicle camera apparatus for use in a vehicle, the in-vehicle camera apparatus comprising:
   at least one image capturing unit configured to capture an image of an external environment of the vehicle;
   at least one housing configured to have the at least one image capturing unit mounted thereto; and
   a mounting part via which the at least one housing is to be mounted to the vehicle,
   wherein
   the mounting part is made of a material having a lower coefficient of linear expansion than the at least one housing, and
   the mounting part has at least one first portion configured to be fixed to the vehicle and a plurality of second portions configured to be fixed to the at least one housing.

2. The in-vehicle camera apparatus as set forth in claim 1, wherein the mounting part is constituted of a metal bracket that is formed separately from the at least one housing and to be fixed between the at least one housing and a part of the vehicle.

3. The in-vehicle camera apparatus as set forth in claim 2, wherein the metal bracket is plate-shaped,
   the at least one first portion of the mounting part is constituted of a major surface of the metal bracket on an opposite side to the at least one housing, and
   each of the second portions of the mounting part is constituted of a bolt provided in the metal bracket to protrude toward the at least one housing.

4. The in-vehicle camera apparatus as set forth in claim 1, wherein the at least one housing comprises a first housing configured to have the at least one image capturing unit mounted thereto and a second housing formed separately from the first housing, and
   the mounting part is constituted of the second housing.

5. The in-vehicle camera apparatus as set forth in claim 1, wherein the at least one image capturing unit comprises a pair of image capturing units, and
   the at least one housing is configured to define a positional relationship between the pair of image capturing units.

6. The in-vehicle camera apparatus as set forth in claim 5, wherein the pair of image capturing units are aligned with each other in a predetermined direction with a clearance provided therebetween, and
   at least two of the second portions of the mounting part are spaced from each other in the predetermined direction at an interval that includes the clearance between the pair of image capturing units.

7. The in-vehicle camera apparatus as set forth in claim 1, wherein the at least one housing has a plurality of heat-dissipating fins formed on a surface thereof.

8. The in-vehicle camera apparatus as set forth in claim 1, further comprising a heater that has at least one hood portion integrally formed therein, the at least one hood portion functioning as a camera hood for the at least one image capturing unit.

9. The in-vehicle camera apparatus as set forth in claim 1, wherein the mounting part is made of iron and the at least one housing is made of aluminum.

* * * * *